Patented July 21, 1936

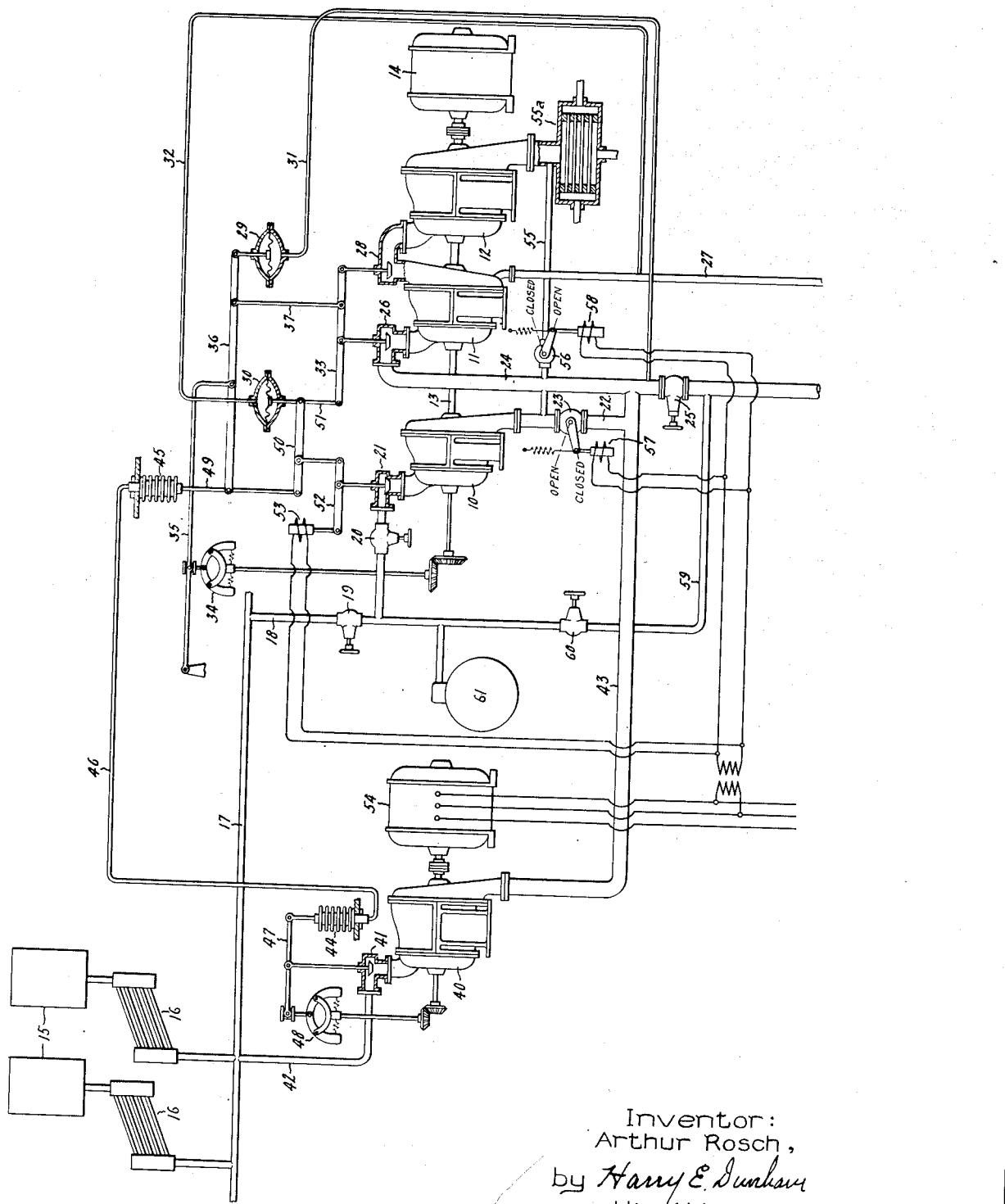

2,048,566

UNITED STATES PATENT OFFICE 2,048,566

ELASTIC FLUID TURBINE POWER PLANT

Arthur Rosch, Berlin, Germany, assignor to General Electric Company, a corporation of New York Application December 6, 1935, Serial No. 53,251
In Germany December 8, 1934

3 Claims. (Cl. 290—4)

The present invention relates to elastic fluid turbine power plants in which a group of turbines is provided for driving electric generators and at the same time for furnishing elastic fluid at a fixed pressure for processing or like purposes. Such elastic fluid is extracted from the turbine by the provision of an extraction conduit or conduits connected to an intermediate stage or stages of the turbine. The invention relates more specifically to the kind of power plants in which the high pressure end of an extraction turbine or group of turbines includes a Curtis type bucket wheel. Such Curtis type wheels are often not desirable in that they cause a considerable drop in pressure.

The object of my invention is to provide an improved arrangement of such power plants whereby they may be operated more economically. This is accomplished by the provision of an auxiliary turbine connected in series with the lower stages of the extraction turbine and the provision of a control mechanism whereby the auxiliary turbine is normally operated and the Curtis type wheel run idle, effecting disconnecting of the auxiliary turbine and operation of the Curtis type wheel upon failure of the auxiliary turbine. In this manner an elastic fluid turbine installation is obtained which during normal operation operates at best efficiency and in which maintenance of operation is insured upon failure of the auxiliary turbine.

For a consideration of what I believe to be novel and my invention, attention is directed to the following description and the claims appended thereto in connection with the accompanying drawing.

The single figure of the drawing represents an elastic fluid turbine power plant embodying my invention.

The arrangement includes an extraction turbine or group of turbines comprising a high pressure part 10 of the Curtis type, a medium pressure part 11 and a low pressure part 12 secured to a shaft 13 driving an electric generator 14. Elastic fluid is suppplied from a source, in the present instance indicated as a battery of boilers 15, with superheaters 16 connected to the turbines 10, 11, 12 by conduits 17, 18 including valve means 19, 20. The turbine 10 has an inlet valve 21 and discharges into the turbine part 11 through a conduit 22 including a valve 23 and a conduit 24. The conduit 24 at the same time forms an extraction conduit and has a hand-operated valve 25. The flow of elastic fluid from the conduit 24 into the turbine part 11 is controlled by means including a valve 26. The intermediate turbine part discharges partly into the low pressure part 12 and partly into another extraction conduit 27. The flow of fluid from the intermediate turbine part 11 into the low pressure turbine part 12 is controlled by a valve 28. The control of the valves 26 and 28 is effected automatically. To this end, pressure-responsive devices 29 and 30 are provided connected by means of pipes 31 and 32 to the extraction conduits 25 and 27 respectively. The pressure-responsive devices 29 and 30 act upon a lever 33 to which latter the valves 26 and 28 are connected. With this arrangement the pressure or like condition of the elastic fluid in the extraction conduits 24 and 27 may be maintained substantially constant during changes in demand for extraction fluid. The speed of the turbine is controlled by a speed governor 34 driven from the turbine shaft and acting upon a fulcrumed lever 35, which latter is connected through a lever 36 and a link 37 to the valve lever 33.

The arrangement so far described is known in the art and represents in substance an extraction turbine or group of turbines with a governing mechanism whereby the turbine valves are controlled in response to speed changes due to changes in demand for mechanical load output and in response to pressure changes in the extraction conduits due to changes in demand for extraction fluid. The mechanism also applies to mixed-pressure turbines to which elastic fluid is conducted to intermediate stages thereof.

The arrangement according to my invention includes an auxiliary turbine 40 having an inlet valve 41 and receiving steam from the conduit 16 through a conduit 42. In accordance with my invention the auxiliary turbine 40 is connected by an exhaust conduit 43 to the conduit 24 whereby the exhaust of the auxiliary turbine 40 is conducted to the intermediate pressure turbine 11. The inlet valve 41 for the auxiliary turbine 40 is controlled in response to movements of the governing mechanism for the turbines 11 and 12, that is, in response to changes in demand for mechanical load output and in demand for extraction steam. To this end the valve 41 is connected by a remote control mechanism comprising two pressure-responsive devices 44 and 45 connected by a pipe 46, the pressure-responsive device 44 being connected through a lever 47 to the valve 41. The left-hand end of the lever 47 is connected to a speed governor 48 driven from the shaft of the turbine 40 and acting primarily as an emergency governor. The pressure-responsive device 45 is connected to a link 49 which has an intermediate point connected to the lever 36 and a lower end pivotally connected to a lever 50. The right-hand end of the lever 50 is pivotally connected to a link 51 between the pressure-responsive device 30 and the lever 33. An intermediate point of the lever 50 is pivotally connected to the right-hand end of a lever 52, which latter has an intermediate point pivoted to the valve 21 and a left-hand end secured to a relay 53. The latter is energized from a generator 54 driven by the turbine 40 in such manner that the valve 21 is normally maintained closed.

During normal operation of the power plant, steam is conducted from the boilers 15 to the auxiliary turbine 40, whence it is discharged through the conduits 43 and 24 into the turbine parts 11, 12. The high pressure turbine part 10 of the Curtis wheel under such condition runs idle, the valve 23 in the conduit 22 being closed. The high pressure part 10 under such condition is maintained under condenser pressure by the provision of a conduit connection 55 including a valve 56 between the exhaust of the high pressure turbine part 10 and a condenser 55a connected to the exhaust of the low pressure turbine part 12. The valve 56 is open during normal operation of the auxiliary turbine 40.

The pressure in the extraction conduits is maintained constant by operation of the pressure-responsive devices 29, 30. Thus, if, for instance, the pressure in the conduit 24 drops, due to an increased demand for extraction fluid, the pressure-responsive device 29 causes downward movement of the right-hand end of the lever 36, effecting simultaneous closing movement of both valves 26 and 28. Closing movement of the valve 26 causes an increase in pressure in the conduit 24 and closing movement of the valve 28 prevents pressure drop in the extraction conduit 27 due to the decreased flow through the turbine part 11. Also, during downward movement of the right-hand end of the lever 36 the latter turns about its connection with the lever 35 so that the left-hand end of the lever 36 is moved upward, effecting compression of a fluid such as gas contained in the bellows 45, to the effect that the pressure-responsive device 44 is moved upward and effects opening movement of the valve 41 of the auxiliary turbine 40, thereby increasing the flow of elastic fluid through the auxiliary turbine and consequently the pressure in the conduit 24. Hence, a drop in pressure in the conduit 24 causes both closing movement of the valve 26 and opening movement of the valve 41. Broadly, a change in extraction-pressure or like condition of the extraction fluid in the extraction conduit causes movement of the valves 26 and 28 in one direction and opposite movement of the valve 41. In contrast thereto, operation of the control mechanism by the action of the speed governor 34 causes movement of all valves in the same direction. For instance, an increase in speed, due to a decrease in demand for mechanical load output, causes downward movement of the left-hand end of the lever 35 so that the right-hand end of the latter is moved downward, and through the lever 36 and the link 37 effects closing movement of the valves 26, 28. Under this condition the lever 36 fulcrums about its right-hand end. Hence, the left-hand end of the level 36 is moved downward, thereby decreasing the pressure in the bellows 45. This in turn effects a decrease in pressure in the bellows 44, resulting in closing movement of the valve 41. If now for any reason the generator 54 should fail, for instance due to a short circuit, the load is automatically transferred from the auxiliary turbine 40 to the high pressure turbine part 10. At the same time the conduit connection between the exhaust of the high pressure part 10 and the intermediate pressure turbine part 11 is opened and the conduit connection between the exhaust of the high pressure turbine part 10 and the condenser 55a is closed. Opening of the valve 21 of the high-pressure turbine part 10 upon failure of the auxiliary generator is effected automatically by means of the aforementioned relay 53 which is energized from the generator 54. Opening of the valve 23 and closing of the valve 56 upon failure of the auxiliary turbine 40 or its generator 54 are also preferably effected automatically. To this end the valves 23 and 56 are connected to relays 57 and 58, which latter are also energized from the generator 54. Upon failure of the auxiliary turbine, elastic fluid is conducted to the high pressure turbine part 10 through the conduits 17 and 18. The conduit 18 is connected by a conduit 59 including valve means 60 to the extraction conduit 25. The valve 60 is normally closed but is opened in case of excessive demands for extraction steam or in case the mechanical load demand from the turbines 11, 12 is low and insufficient to satisfy the demand for extraction steam. The conduit 59 is furthermore connected to an auxiliary boiler 61 provided primarily for furnishing processing steam to the extraction conduit 25 in case the demand for processing steam exceeds the capacity of the boilers 16.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,—

1. Elastic fluid turbine power plant including the combination of turbine means comprising a high pressure part and low pressure parts connected in series, a generator driven by the turbine means, an auxiliary turbine, an auxiliary generator driven by the auxiliary turbine, control mechanisms for the turbine means and the auxiliary turbine arranged to control the auxiliary turbine in response to changes in operating conditions of the turbine means, a conduit for connecting the exhaust of the auxiliary turbine to the lower pressure parts of the turbine means, the high pressure part running normally idle, and means for automatically transferring the load from the auxiliary turbine to said high pressure part upon failure of the auxiliary turbine.

2. Elastic fluid turbine power plant including the combination of turbine means comprising a high pressure part and low pressure parts connected in series, a generator driven by the turbine means, an auxiliary turbine, an auxiliary generator driven by the auxiliary turbine, control mechanisms for the turbine means and the auxiliary turbine arranged to control the auxiliary turbine in response to changes in operating conditions of the turbine means, a conduit for connecting the exhaust of the auxiliary turbine to the inlet of the low pressure parts of the turbine means, the high pressure part running normally idle, means for automatically transferring the load from the auxiliary turbine to said high pressure part upon failure of the auxiliary turbine, extraction conduits connected to the inlet and an intermediate stage of the low pressure parts, and means including said governing mechanisms for maintaining the pressure in the extraction conduits constant during changes in demand for extraction fluid.

3. Elastic fluid turbine power plant including the combination of a high pressure turbine having a Curtis wheel, a low pressure turbine connected in series to the high pressure turbine as regards the direction of elastic fluid therethrough, said turbines being provided on a single shaft, a generator driven by said shaft, an extraction conduit intermediate the high pressure turbine and the low pressure turbine, speed and pressure-responsive governing mechanisms for controlling said turbines in response to changes in demand for mechanical load output and in response to changes in demand for extraction fluid, an auxiliary turbine having an exhaust connected to the extraction conduit whereby the exhaust of the auxiliary turbine is normally conducted at least partly to the low pressure turbines, an inlet valve for the high pressure turbine, means normally maintaining the inlet valve shut, a condenser for the low pressure turbine, a conduit including a valve connecting the condenser to the high pressure turbine whereby the latter is normally run idle under condenser pressure, and means for automatically putting the high pressure turbine in operation and disconnecting the auxiliary turbine upon failure thereof.

ARTHUR ROSCH.